United States Patent [19]
Walker

[11] Patent Number: 5,802,533
[45] Date of Patent: Sep. 1, 1998

[54] TEXT PROCESSOR

[76] Inventor: Randall C. Walker, 923 Tenth St., SW., Rochester, Minn. 55902

[21] Appl. No.: 693,444

[22] Filed: Aug. 7, 1996

[51] Int. Cl.⁶ .................................................. G06F 17/27
[52] U.S. Cl. .......................................................... 707/529
[58] Field of Search ................................... 395/779–781, 395/788–791, 754–757; 434/178, 179, 184; 707/517–529

[56] References Cited

U.S. PATENT DOCUMENTS

| | | | |
|---|---|---|---|
| 4,613,309 | 9/1986 | McCloskey | 434/170 |
| 4,661,924 | 4/1987 | Okamoto et al. | 704/8 |
| 4,880,385 | 11/1989 | Huang | 434/181 |
| 4,887,212 | 12/1989 | Zamora et al. | 704/8 |
| 5,060,155 | 10/1991 | Van Zuijlen | 704/9 |
| 5,068,789 | 11/1991 | van Vliembergen | 704/9 |
| 5,083,268 | 1/1992 | Hemphill et al. | 395/12 |
| 5,146,405 | 9/1992 | Church | 704/9 |
| 5,211,563 | 5/1993 | Haga et al. | 434/322 |
| 5,267,331 | 11/1993 | Siwoff | 382/274 |
| 5,278,943 | 1/1994 | Gasper et al. | 704/200 |
| 5,293,464 | 3/1994 | Hirano et al. | 395/101 |
| 5,299,125 | 3/1994 | Baker et al. | 704/9 |
| 5,311,294 | 5/1994 | Cromer et al. | 348/180 |
| 5,331,556 | 7/1994 | Black, Jr. et al. | 704/9 |
| 5,404,432 | 4/1995 | Koopman et al. | 707/528 |
| 5,408,603 | 4/1995 | Van De Lavoir et al. | 345/349 |
| 5,432,948 | 7/1995 | Davis et al. | 704/2 |
| 5,442,742 | 8/1995 | Greyson et al. | 707/539 |
| 5,475,588 | 12/1995 | Schabes et al. | 704/9 |
| 5,494,360 | 2/1996 | Watanabe et al. | 400/83 |
| 5,513,305 | 4/1996 | Maghbouleh | 707/502 |

OTHER PUBLICATIONS

Just et al., *The Psychology of Reading and Language Comprehension*, Allyn and Bacon, Boston, 1987.

Kruk. Richard S., Processing Test on Monitors, Chapter 21 in *Visual Processes in Reading and Reading Disabilities*, Willows, DM et al., eds., Lawrence Erlbaum Assoc., Hillsdale, NJ (1993), pp. 457–471.

Chomsky, Noam, *Some Concepts and Consequences of the Theory of Government and Binding*, MIT Press, Cambridge, MA, 1982, p. 15.

Larson, R.K., et al., *Syntactica*, MIT Press, Cambridge, MA 1996, pp. 1–4 and 81–89.

Muter, Paul, "Interface Design and Optimization of Reading of Continuous Text", in van Oostendorp, H. and DeMul, S. (Eds.) (In Press), *Cognitive Aspects of Electronic Text Processing*, Ablex Publishing Corp., Norwood, NJ (Manuscript taken off of Author's Internet site; publisher called Oct. 2,1996, publication of book expected in November, 1996).

Wahlster, Wolfgang, et al., "Plan–Based Integration of Natural Language and Graphics Generation", [Reprinted from Artificial Intelligence, an international journal, vol. 63, No. 1 and 2, 1993], pp. 387–427.

Pereira, Fernando C. N. and Grosz, Barbara J., *Natural Language Processing*, [Reprinted from Artifical Intelligence, an international journal, vol. 63, Nos. 1–15, 1993] MIT Press, Cambridge, MA 1994, pp. 1–15.

Frith et al., "A biological marker for dyslexia", *Nature* vol. 382, Jul. 4, 1996, pp. 19–20, 66–69.

*Primary Examiner*—Anton Fetting
*Attorney, Agent, or Firm*—Nawrocki, Rooney & Sivertson, P.A.

[57] ABSTRACT

A text enhancement method and apparatus for the presentation of text for improved human reading. The method includes extracting text specific attributes from machine readable text and varying the text presentation in accordance with the attributes. The preferred embodiment of the method: extracts parts of speech and punctuation from a sentence, applies folding rules which use the parts of speech to determine folding points, uses the folding points to divide the sentence into text segments, applies horizontal displacement rules to determine horizontal displacement for the text segments, and presents the text segments each on a new line and having the determined horizontal displacement. Another embodiment displays text color based on parts of speech.

21 Claims, 11 Drawing Sheets

Fig. 2

| SE# | ELEMENT | TYPE | PM CAT. | WORD POS, DICT | WORD POS, MG | WORD CAPIT- ALIZED | # CHAR- ACTERS | # SYLLA- BLES | PRON- UNCIA- TION TIME, SECONDS | EDUC- ATION LEVEL |
|---|---|---|---|---|---|---|---|---|---|---|
| 1 | I | W | | PRON. | | YES | 1 | 1 | .5 | 1 |
| 2 | | S | | | | | | | | |
| 3 | had | W | | VERB | | | 3 | 1 | .25 | 1 |
| 4 | | S | | | | | | | | |
| 5 | a | W | | ARTICLE | | | 1 | 1 | .25 | 1 |
| 6 | | S | | | | | | | | |
| 7 | farm | W | | N-V-A | NOUN | | 4 | 1 | .75 | 1 |
| 8 | | S | | | | | | | | |
| 9 | in | W | | PREP | | | 2 | 1 | .25 | 1 |
| 10 | | S | | | | | | | | |
| 11 | Africa | W | | NOUN | | YES | 6 | 3 | 1.0 | 3 |
| 12 | , | PM | COMMA | | | | 1 | | .5 | |
| 13 | | S | | | | | | | .5 | |
| 14 | at | W | | PREP | | | 2 | 1 | .25 | 1 |
| 15 | | S | | | | | | | | |
| 16 | the | W | | ARTICLE | | | 3 | 1 | .25 | 1 |
| 17 | | S | | | | | | | | |
| 18 | foot | W | | N-V-A | NOUN | | 4 | 1 | .5 | 1 |
| 19 | | S | | | | | | | | |
| 20 | of | W | | PREP | | | 2 | 1 | .25 | 1 |
| 21 | | S | | | | | | | | |
| 22 | the | W | | ARTICLE | | | 3 | 1 | .25 | 1 |
| 23 | | S | | | | | | | | |
| 24 | Ngong | W | | NOUN | | YES | 5 | 2 | 1.0 | 12 |
| 25 | | S | | | | | | | | |
| 26 | Hills | W | | NOUN | | YES | 5 | 1 | .75 | 2 |
| 27 | . | PM | PERIOD | | | | | | .5 | |

*Fig. 3*

The geographical position,
and the height of the land,
combined to create a landscape
that had not its like
in all the world.

*Fig. 4*

The geographical position,
and the height
of the land,
combined to create a landscape
that had not its like
in all the world.

Fig. 6

| CLASS 1, SUBCLASS 1 PREPOSITIONS | AMID, BESIDES, AGAINST, AMONG, ABOUT, BY (WITH GERUND), DURING, SINCE, THROUGHOUT, WITHIN, UNTO, ALONG, EXCEPT, AROUND, THROUGH, UNTIL, WITHOUT |
|---|---|
| CLASS 1, SUBCLASS 2 CONJUNCTIONS | ALTHOUGH, AS THOUGH, UNLESS, UNTIL, AS IF, SO THAT, IN ORDER THAT, BECAUSE, BUT |
| CLASS 1, SUBCLASS 3 RELATIVE PRONOUNS | TO WHOM, TO WHOEVER |
| CLASS 1, SUBCLASS 4 OTHER | RATHER THAN, IN LIEU OF, INSTEAD OF |
| CLASS 2, SUBCLASS 1 PREPOSITIONS | ABOVE, BEFORE, BENEATH, BETWEEN, UP, ACROSS, TOWARD, UPON, AFTER, UNDER, TO (WITH VERB) |
| CLASS 2, SUBCLASS 2 CONJUNCTIONS | WHEN, WHERE, WHENEVER, WHEREVER, WHILE, AND (WITH RESTRICTIONS), OR (WITH) RESTRICTIONS), IF |
| CLASS 2, SUBCLASS 3 RELATIVE PRONOUNS | WHAT, WHOM, WHICH, WHO, WHOSE |
| CLASS 2, SUBLCLASS 4 OTHER | NOUN/VERB INTERFACES, ADVERBS FOLLOWING A VERB |
| CLASS 3, SUBCLASS 1 PREPOSTIONS | FOR, AT, TO (WITH NON-VERBS), WITH, OF, IN, BY (WITHOUT GERUND), FROM, ON |

Fig. 8

```
// SP = SUPER-PHRASE
// SFR = SECONDARY FOLDING RULE
// MIN = MINIMUM LINE LENGTH
// MAX = MAXIMUM LINE LENGTH

FOR ALL SP IN SENTENCE
   FOR ALL LEVELS OF SFR, FROM LOW TO HIGH
      FOR ALL WORDS IN SP, FROM LEFT TO RIGHT
         IF RESULTING TEXT SEGMENT WOULD BE > MIN
            APPLY SFR, CREATING NEW TEXT SEGMENT
         ELSE
            DO NOT APPLY SFR THEREBY \
            ADDING TO LENGTH OF NEXT \
            TEXT SEGMENT
         ENDIF
      END FOR ALL WORDS IN SP
   END FOR ALL LEVELS OF SFR
END FOR ALL SP IN SENTENCE

FOR ALL TEXT SEGMENTS CREATED
   WHILE TEXT SEGMENT LENGTH IS > MAX
      APPLY COLLAPSE RULE THEREBY \
      CREATING MULTIPLE TEXT SEGMENTS
   END WHILE
END FOR ALL TEXT SEGMENTS CREATED
```

TEXT PROCESSOR

FIELD OF THE INVENTION

The present invention relates to computer assisted text presentation. More specifically, the invention relates to enhanced text presentation using content specific attributes to improve the reading experience.

BACKGROUND OF THE INVENTION

The purpose of reading is to make an impact on the mind of the reader. This is true whether the text being read comprises a novel or a heads-up aircraft display. Material presented in a non-textual medium conveys information well suited to human absorption beyond the corresponding, one dimensional text. Still pictures present object attributes such as colors, relative sizes, relative locations, patterns, groupings, and hierarchies. An object is viewed in a context. For example, a picture of a small object located with others in a corner conveys different information than the same object, enlarged, by itself, and in the center. Beginning sentences and paragraphs add contextual information by their location alone. Moving pictures have movement and temporal change as added attributes. Much information comes into the brain visually and through pattern recognition. Other information comes as audio information, conveying information through tone, changing inflection, and changing volume level.

Computer presentation of text for human reading has failed to utilize much of the human brain. As a result, only a part of the possible bandwidth is utilized, and computer text presentation is often thought of as unfriendly, constant, mechanical, and generally lacking in some way. When given the choice, most people prefer to read a book in print rather than a book on a computer screen. Current computer text presentation is poor relative to a book, and even poorer relative to its potential.

Some work has been done in computerized text presentation. Huanng (U.S. Pat. No. 4,880,385) discloses an optomechanical speed reading device that allows viewing text printed on paper through a viewing window one line at a time, automatically advancing lines.

Advances have been made in methods for the computerized parsing of natural language into parts of speech. Schabes et al. (U.S. Pat. No. 5,475,588), disclose an improved parsing system for creating parse trees. Black, Jr. et al. (U.S. Pat. No. 5,331,556) disclose a method for storing parts of speech information in a file along with the original text for improved subsequent searching of the text. Okamoto et al. (U.S. Pat. No. 4,661,924), and Church (U.S. Pat. No. 5,146,405) disclose methods for disambiguating multiple-parts of-speech. Zamora et al. (U.S. Pat. No. 4,887,212), van Vliembergen (U.S. Pat. No. 5,068,789), Hemphill et al. (U.S. Pat. No. 5,083,268) disclose methods for parsing natural language text. All of the above cited patents are herein incorporated by reference.

Reading is a complex process and there are many factors that determine differences in reading performance between readers and even for the same reader on different occasions. These include innate neurophysiological conditions such as dyslexia, but also age; behavioral and motivational factors; level of education and prior reading practice; and perceptual constraints. A reader may also have different reading objectives that will affect how he/she approaches the reading material. Despite all of the above, text is presented by computers, at worst, as one dimensional "beads on a string", at best, similar to the two dimensional text presented by books. Indeed, whether text is presented in print or on an electronic display matters little because the text presentation is essentially identical.

Examples of the constant presentation of text are numerous. Topic sentences are presented the same as other sentences in a paragraph. Technical words are presented no different than non-technical words. Adjectives appear the same as nouns. Educationally difficult terms are presented the same as simple terms. The last paragraph in a chapter is presented the same as the first paragraph. Text is presented in left justified, broken lines of constant width requiring a jerking eye movement from far right to far left at regular intervals. Text is broken in mid-sentence, mid-phrase and mid-thought, applying ancient typesetting rules. Such text forces the eye to travel back and forth over large distances, mimicking a typewriter carriage. Text is advanced manually, broken into chunks determined by how many lines can fit on the screen.

There are several good reasons for not placing only one enhanced sentence per page in a book. These reasons may have been inappropriately carried over into the computer display of text. The possibility of modifying text presentation to enhance the reader's ability to read text by harnessing the power of digital manipulation appears to have been overlooked by those most knowledgeable in computing.

SUMMARY OF THE INVENTION

The present invention is directed to a text enhancement method and apparatus for the presentation of text for improved human reading. The invention includes extracting text specific attributes from machine readable text, varying the text presentation in accordance with the attributes, and creating a three dimensional (time and reading surface) visual product for enhancing the reading experience. The preferred embodiment of the invention extracts attributes such as parts of speech from an input sentence and displays that sentence in cascading text segments down and across the screen. The segmentation and horizontal displacement is determined by applying rules which utilize parts of speech, punctuation, and reader-preferences. The color of the text and background can also be varied depending on the parts of speech and on the position of sentences within paragraphs and paragraphs within chapters.

The invention adds meaningful visual attributes to enhance the presentation of computer displayed text above the constant and mechanical textual display of current systems. A meaningful visual cue is created that relates to the content of the new phrase and its relationship to the previous phrase. This cue is available before the text is read, giving context to the text. The sentence parsing processing uses the sentence's punctuation and content to create a system of meaningful visual cues including distinct phrases which promotes quicker recognition of the words in a phrase and their meanings. The enhanced sentence cascades down the page in a pattern of meaningful phrases determined by text content and reader preferences, the eyes moving a short distance from phrase to phrase.

A sentence represents a complete thought, and a paragraph represents a discrete subject or argument. Reading comprehension improves when one sentence appears at a time and when the transition from one paragraph to another is visually signalled and includes a pause for the appearance of these elements of text. The invention creates appropriate visual attributes to provide these visual signals. The visual attributes can include text segmentation, horizontal displacement of one line relative to another, text and background color, text brightness, and animation. The animation can include blinking and swiping, the time dependent, temporary, progressive brightening of elements of text, and the movement of text from standard to cascaded presentation.

In an exemplary reading session, the reader selects text to read, and informs the reading system the text type, e.g. a novel. The reading system retrieves the proper environment previously stored for that reader reading that selected text type. The reader has the opportunity to edit the reading rules and word sets but declines. Starting at the beginning of a chapter, where the reader left off, text is presented, one sentence at a time, cascaded down and across the screen. As the lines displayed are broken into meaningful text segments rather than arbitrarily ending at 80 characters, reading and comprehending an entire segment at a time is possible, with the resulting eye movement being from center of text segment to center of text segment, down and across the screen. The sentence background color is a function of the sentence position within the paragraph and the paragraph position within the chapter. Each of the sentences in a paragraph may have the same hue, but have incremental, but discernable changes in color saturation or darkness between sentences, and incremental, but discernible changes in hue between paragraphs. The background color thus provides non-literal positional information, signalling the beginning and end of a paragraph, and the beginning and end of a chapter.

Sentences are segmented according to reader approved rules. Each preposition folds a phrase in a predictable way, resulting in two text segments, each lying on a new line. The content of the line above effects the horizontal displacement of the line below. The same preposition folds and horizontally displaces text the same way whenever possible. As a result, the same preposition causes a similar pattern, long since familiar to the reader. Parts of speech effect the text color according to reader approved rules. As a result, both sentence structure and parts of speech are immediately recognizable from pattern and color recognition, even before a word of text is recognized, providing visual, non-literal cues to the reader.

The sentences advance at a rate using a rule previously selected by the reader. The formula is a function of the text type, number or words, educational level, and number of syllables present in the line. The advancement rate is a little faster than the reader's comfortable rate, to increase comprehension. A longer pause between sentence presentations signals a new paragraph before it appears. The reader is able to easily interact with the reading system, holding difficult sentences on the screen longer, and speeding up or slowing down the presentation.

The above described exemplary reading session is exemplary, not limiting or exhausting the possible embodiments within the scope of the invention.

The enhancement process exploits the fact that the elements of text have non-literal qualities that can be used to produce a text presentation product in time and in space that is more meaningful and enhances the reader's ability to comprehend the literal meaning of the text to a greater degree than existing formats on computers or paper. The cascading of phrases down and across the screen imparts a visual corollary as to how the text might be experienced if heard from a live reading, without the reader having to subvocalize it. Reading such an enhanced text is almost like listening with the eyes, but as a total visual packet that is experienced almost simultaneously.

BRIEF DESCRIPTION OF THE DRAWINGS

FIG. 2 is a table illustrating various attributes of the elements in one sentence;

FIG. 3 contains an example of enhanced text including cascade and right descent angles;

FIG. 4 presents the sentence of FIG. 3 as enhanced text including cascade and right and left descent angles;

FIG. 6 illustrates word sets establishing a hierarchy of secondary folding points;

FIG. 8 illustrates step 136 in detail;

DETAILED DESCRIPTION OF THE PREFERRED EMBODIMENTS

Figure 1:
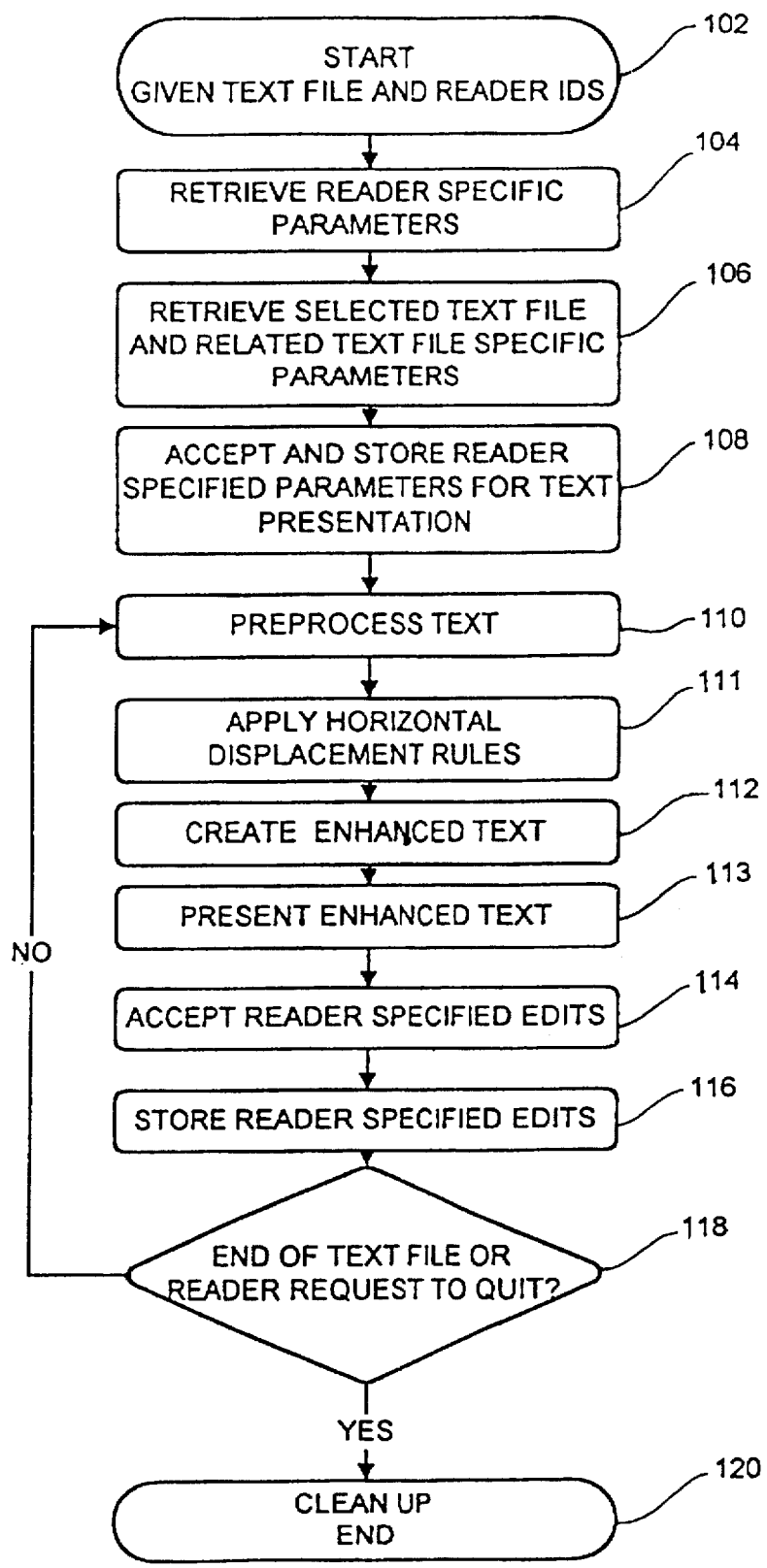
FIG. 1 is a high-level flow-chart of a method utilized in an embodiment of the invention.

FIG. 1 shows a high-level flow-chart of a method utilized in an embodiment of the invention. The steps in FIG. 1 and all such figures may of course be split into additional steps or merged into fewer steps and still describe the same embodiment.

In step 102, the reading device is started, and passed the identification (ID) of the reader and the text file identification to be read. In a preferred embodiment, the reader ID is obtained from the operating system. In another embodiment the reader is prompted for identification. In one embodiment, there is but one reader of the device assumed. Given the reader ID, reader specified parameters are retrieved in step 104. Parameters are discussed in detail below. Given the text ID, the text file and text specific parameters are retrieved in step 104. In a preferred embodiment, the parameters have default values, and do not require reader entry. In a most preferred embodiment, entry of reader preferred specific parameters is allowed, values accepted, and the parameter values stored as in step 108. In one embodiment, the user is allowed to pull down menus containing dialog boxes, view default parameters, and modify them using standard user interfaces including numerical entry, text entry, slide bars, and buttons. In a preferred embodiment, given suitable access permission, modification of global parameters applying to all readers of the text is also allowed. The reader is allowed to have parameters set for only the current text, all texts of the same type as the current text, or all texts read by this reader.

Reader specific parameters include: viewing field dimensions; color palette for background and text; word set inputs for rules; minimum phrase length; maximum line length; minimum and maximum text segment weight; descent angles; horizontal displacement rule inputs; horizontal justification preferences; inter-phrase gap length; advancement rate; inter-sentence and inter paragraph interval proportions; Tagging definitions; animation specifications; definitions of parameters to derive content dependent presentation intervals; definitions of parameters and weighting to derive phrase/text matter, weight, density, complexity, and content; and identities of special event scripts.

Viewing Field Dimensions

Viewing field dimensions can specify the size of the window for viewing text in the two X and Y dimensions and a third dimension, time. This field can include the entire screen or a smaller portion of the screen. The time dimension can include the time over which time dependent animations such as blinking occur.

Color Palette

Color palette for background and text allows specification of preferred background and text color that varies with the text. In a preferred embodiment, the hue and brightness of the background color vary with both sentence position within a paragraph, and paragraph position within a chapter. In a most preferred embodiment, the brightness is set at one level for the first sentence in a paragraph and a second level for the last sentence in the paragraph, with the brightness of each sentence in between progressing from the first level to the second level. In a preferred embodiment, the background hue is set at a first value for the first paragraph in a chapter and a second value for the last paragraph in a chapter, with the hue of each paragraph progressing from the first value to the second value. In a most preferred embodiment, the first hue is green and the second hue is violet.

In preferred embodiments, text color can vary with a word's categorical and continuous attributes. A categorical attribute is a function of the category a word fits into. In a most preferred embodiment, categories include parts of speech e.g. verb, and technical words. Continuous attributes include those that can be measured such as educational level e.g. twelfth grade, number of syllables, and word length. In a preferred embodiment, different parts of speech have different text colors. In a most preferred embodiment, text color is varied with background color to provide optimal, reader-preferred contrast.

Word sets can be used to specify some parts of speech. For example, "I" is a pronoun, "had" is a verb, "a" is an article, and "farm" could be a noun, verb, or adjective. The parts of speech need only be likely parts of speech as with the word "farm", which could be a noun, verb, or adjective. An example of the parts of speech in a single sentence is shown in FIG. 2. The multiple possible parts of speech column 150 is shown as is the disambiguated part of speech column 152.

Word sets are input in preferred embodiments utilizing two methods. The first method utilizes a structured text format such as Standard Generalized Mark-Up Language (SGML), allowing for import and export of large word sets and dictionaries from diverse sources. Standard SGML parsers are then utilized to store the word sets in a suitable database. The second method allows interactive editing of word sets using a hierarchy of pull menus and dialog boxes. In a preferred embodiment, the reader specified word sets are stored in a separate database from the dictionary or glossary word sets, to allow for separate storage, editing and faster retrieval.

Minimum Text Segment Length & Maximum Line Length

A preferred embodiment includes a reader specified minimum text segment length. A text segment is a piece of text that is presented on one line on a display. The minimum text segment length, which can be denominated in words, is the minimum the reader wishes to see on a separate line. A maximum line length is the maximum length the reader wishes to see on one line. Lengths can be measured in number of characters, words, syllables, educational level, or any sum of products of these. In one embodiment, the minimum line length is ten characters and the maximum line length is thirty five characters.

Phrase Weight

Phrase weight is a derived attribute of a phrase (text segment or potential text segment) giving some measure of the amount of material in a phrase. In one embodiment, the phrase weight is simply the number of words in a phrase. In preferred embodiment, phrase weight includes phrase density and phrase complexity. Phrase density can include the number of technical words or number of words exceeding a certain grade level. Phrase complexity can include the number of spelling similarities between words in a phrase, number of ambiguous words, and total weight of reader weight-specified words.

Minimum and Maximum Text Segment Weight

A preferred embodiment includes a reader specified minimum and maximum text segment weight. The text segment weight, is the quantity of text the reader wishes to see on a separate line. In preferred embodiments, the text segment weight is the sum of phrase weights within the text segment.

Horizontal Justification Rules

Horizontal justification rules specify the horizontal justification of a line of text relative to the line above. Justification can include the justification type for the line or phrase being positioned, i.e. right, left, or center justification. Justification can also include the text portion of the line above from which the justification is measured, i.e. the entire line of text versus or one phrase, the point of that portion used, e.g. left-most, right-most, or center. Horizontal justification in one embodiment is simply measured within the line being positioned rather than relative to the line above.

In a preferred embodiment, the first phrase on a line is center justified, measured from the center of the last phrase in the line immediately above. In another embodiment, the entire line of text is center justified below the center of the line of text above. In yet another embodiment, the text segment "center of gravity", calculated using the difficulty of each word, is used as the text segment center for justification purposes.

Descent Angle

A descent angle is the amount of horizontal displacement for each new line, modifying the horizontal position called for by the horizontal justification rules alone. By definition, each text segment is presented on a new line. In a preferred embodiment, the descent angle is specified in units of characters. The descent angle and horizontal justification at least partially determine the "text cascade" down and across the screen in preferred embodiments. An example of cascading text is illustrated in FIGS. 3 and 4. A descent angle may be zero, meaning that, without more, the text segment horizontal position is determined by the horizontal justification rules alone. A descent angle can be left, where the line below is to be shifted left relative to the line above, or right, where the text shifts right. FIG. 3 illustrates only right descent angles.

In one embodiment, the decent angle in a constant for each new line. In a preferred embodiment, the descent angle is a function of the text segment weight of the line above. In another preferred embodiment, horizontal justification rules call for center justification below the center of each line immediately above, and the descent angle is calculated to present a substantially straight path, when all text lines are presented, from center of line to center of line, from upper left to lower right on the display surface.

In a preferred embodiment, the inputs to descent angle rules include attributes of the text in the line above. In one preferred embodiment, inputs include the reason for folding the line above, i.e. primary folding point, secondary folding point, or collapse rule. In a preferred embodiment, a more positive descent angle is called for when the line immediately above folded due to a primary folding point than a secondary folding point. In another preferred embodiment, the inputs include the text segment weight of the current line and the line above.

It is recognized that the horizontal justification rule could call for left justification and measuring horizontal displacement from the left margin, as well as a zero descent angle, combing to result in left justified text on each line.

It is also recognized that horizontal text positioning can be accomplished in numerous equivalent ways to the above example. In particular, calculations of text position can be accomplished by first justifying then shifting, or first shifting then justifying with equivalent results.

Gap Length

In one embodiment, gaps are associated with folding points whose locations have been determined, but because of other rules, remain on the same line and do not cause folding. A gap of zero or more spaces is added after a folding point where that folding point has failed to cause new line creation. In a preferred embodiment, the gap length is a reader determined parameter, where a gap length of zero results in a no gaps being created. Gaps allow a visual cue as to the existence of phrases even where the phrases have not caused new line formation.

Advancement Rates

Advancement rates specify display duration times and the time intervals between the presentation of one grouping of text and the next. In a preferred embodiment, one sentence is presented on one screen. In a preferred embodiment, the display duration rate can be a function of the text's appropriately weighted number of words, educational level, pronunciation time, number of phrases, number of syllables, or phrase weight. Time intervals can include the interval between sentences and paragraphs. In a preferred embodiment, the time interval between sentences and paragraphs is different. In this way, the constant arrival rate of text in current systems can be replaced with a rate dependent on where the text lies and what the content of the text is.

Stations

Stations are display surface locations at which text is displayed. Stations may be identified windows within which text is presented or points at which text presentation begins. A preferred embodiment includes an active text station, where text being read is presented. Another preferred embodiment includes a pre-reading station displaying about to be read text and a post-reading station displaying already read text. In one embodiment, the total text presented at all stations on the viewing surface is controlled by the expected reading or pronunciation time. In one embodiment, only about one minute of material is allowed on the screen at any one time.

Animation

Animation is the time dependent presentation of text. Examples of animation include blinking, dissolving, and swiping, that is, the brightening of successive text portions at a specified rate. In a preferred embodiment, a modified scroll effect is accomplished by stacking about to be read text in flat rows at a pre-reading station at the top of the screen, stacking previously read rows at a post-reading station at the bottom of the screen, and cascading the active sentence at an active station across the middle of the screen. In one embodiment, pre-reading and post reading text and/or background colors differ from that of the currently being read text.

Tagging

Tagging includes designating whether a sentence will be tagged with a definition or a drawing related to the word. In a preferred embodiment, a word set specifies which words will be tagged with a definition. When a tagged word is selected by a reader, a definition, drawing or other electronic illustration of the word can be displayed. In a preferred embodiment, a tagged word, when selected, displays a pop-up window containing the definition or drawing. Preferred methods of selection include using a mouse and right shift button.

Reading Event

A reading event includes the appearance and disappearance of a sentence and any additional time before the appearance of the next sentence. A reading event contains a series of reading moments. A reading moment is a freeze frame appearance of text to the eyes of the reader trying to comprehend the text. To many readers, the reading moment will find the eye centered on a phrase, the phrase alone on a line, the reader comprehending the single phrase.

Reading Rate

The presentation interval is the duration of a sentence presentation on the screen. The presentation interval may be reader controlled or automatically determined. Reader control in one embodiment may be via mouse clicks. In another embodiment, reader control may be via eye movement detection or brain wave change detection. Brain wave detection operates by generating a new sentence request when the brain waves corresponding to reading activity change to brain waves associated with having finished reading the sentence.

Reading rate is measured in text content per unit of time. Such Text Content Units may be measured in length units such as number of words, syllables, pronunciation time, or any of previously discussed measures of phrase length or weight or any sum of products of these. Text Content Units may also be measured in complexity units such as those previously discussed with respect to phrase complexity or weight or any sum of products of these. The Text Content Units in a preferred embodiment are calculated for a presented sentence and used to compare the actual reading rate in Text Content Units per time with reader controlled presentation intervals, and to set the text presentation interval for automatically controlled text presentation intervals. In this way, the presentation interval can be made content dependent, and be made to track the likely reader preferred presentation rate.

Special Events

Special events are time dependent events that occur during the reading event. Special events include a visual or audible cue giving a time remaining signal. For example, when 75% of the content dependent presentation interval has elapsed, a visual cue would appear on the screen. Special events may be arranged by a special event script. Complex special events include a series of special events.

Visual Pronunciation

Visual pronunciation involves staggering in time the color or brightness changes of individual phrases, words, and syllables, though not necessarily all of these. One embodiment denotes emphasis on longer, more difficult words requiring longer to pronounce by using highlighting. Visual pronunciation is an example of a complex special event.

Pulling Down the Cascade

In one embodiment, text is displayed at a pre-reading station for a percentage of the content dependent presentation interval, then presented in a sentence cascade one text segment or one line at a time. Pulling down the cascade is an example of a complex special event.

Non-Linear Text

Linear text is text presented and read from beginning to end. A book designed to be read from beginning to end is a common example of linear text. Non-linear text includes the presentation and reading of text in an order other than linear. One example of non-linear text is Hypertext, where certain words are presented in such a way to indicate linkage e.g. the text is angle bracketed or colored blue. Non-linear text presentation can be both reader directed and automatic. One example of this is automatic presentation of Hypertext in a depth first order, following the first Hypertext link, ignoring cycles. Another example is a breadth first presentation, presenting the first level of text, followed by any Hypertext links from the main level, followed by any Hypertext links from the first level, continuing until the lowest depth is reached or the reader intervenes. Yet another example is pruning either depth or breadth first presentation to include only portions having certain keywords of interest.

Magic Reading Glass

In one embodiment, text presentation may begin by presenting common, unformatted text. When the reader desires to see text presented as enhanced text, the reader designates a portion of text for enhancement by placing an icon such as a "magic reading glass icon" over some part of the sentence. That sentence and following sentences are presented as enhanced text. This enhanced text presentation continues until the reader deactivates the magic reading glass. This magic reading glass can serve as an alternate point of entry into the enhanced text processor.

Method

In FIG. 1, step 110, the text is preprocessed. Step 110 is shown in detail in FIG. 5. The text is parsed to identify paragraphs, sentences, words, and punctuation. Paragraphs may be identified by blank lines, paragraph markers, indentation characters, tab characters, or any other suitable characteristic in the text. Sentences may be identified using grammar rules including periods, spacing, capitalization of first words, and abbreviations or the lack thereof. In a preferred embodiment reading well behaved text, a period, question mark, or exclamation point, either alone or followed by a period, followed by two spaces or end of paragraph, signals the end of a sentence.

In step 124, the sentence is tokenized into words and punctuation. Original author specified emphasis, e.g. italics or underlining, is preserved in preferred embodiments. A standard lexical scanner such as Lex (TRADEMARK) is used in one embodiment, where the end of a word is denoted in the grammar rules by white space or punctuation. Another embodiment utilizes a hand written lexical analyzer. One embodiment stores formatting characters such as tabs and indents as punctuation. The location of a word is preferably stored as an attribute of the word, to provide links to, and searching within, the original work.

A preferred embodiment also allows groups of words to be "clamped" together, and be recognized as a group of words. In one embodiment, such groups of words are recognized by the lexical scanner. In another embodiment, such words are recognized by a preprocessor preceding the lexical scanner to insure recognition as a phrase rather than as merely individual words. Clamped words, for example, "Prince of Whales", would be recognized as a single phrase, and preferably not broken by the preposition into two phrases displayed on two lines.

In step 126, the words are looked up in dictionaries, glossaries and tables to determine word attributes. The text is further processed to determine categorical and continuous attributes. In a preferred embodiment, important categorical attributes include parts of speech, and important continuous attributes include word location, education level, pronunciation time, and syllable number, location, sound, and vocal emphasis level. Identifying parts of speech with 100% accuracy would require extensive programming to determine the real-world context of the text. Such accuracy is not required to practice the invention, as errors are of minor consequence because the reader is a human, not a machine. The possible parts of speech are first determined by looking up the word in a dictionary or glossary. This dictionary or glossary need only have the likely parts of speech for a word, not a definition. For example, the word "farm" could be a noun, verb or adjective. A preferred embodiment stores the parts of speech attribute using a bitmap to preserve the multiple possible parts of speech. One embodiment explicitly stores an ambiguity attribute, indicating whether the word still has multiple possible parts of speech. Another embodiment uses the existence of more than a single possible part of speech as an ambiguity indication.

In a preferred embodiment, default parts of speech exist in a dictionary and may be looked up. In a most preferred embodiment, a word set may be added to override or supplement the default set. In another embodiment, technical words are specified by user entered word sets.

FIG. 6 illustrates nine word sets specifying parts of speech arranged in a hierarchy. Such word sets and hierarchies are also used as input to folding rules, described later. A preferred embodiment checks the word sets illustrated in FIG. 6, beginning with Class 1, Subclass 1, and ending with Class 3, Subclass 1. Search is terminated once a word or phrase is found. Given the limited vocabulary and static nature of the word sets in FIG. 6, a most preferred embodiment utilizes a fast, hand written parser to search for the words and phrases in FIG. 6. Preferred embodiments include parsers written in C, C++, Perl, compiled AWK, AWK and AWK to C, C with regular expression functions, or any suitable language. One parser embodiment utilizes YACC.

In one embodiment, the dictionary is a commercially available dictionary on electronic media such CD-ROM. The standard dictionary is parsed for word attributes such as parts of speech and number of syllables. As word definitions are not needed in many embodiments, storage of numerous words with associated number of syllables and parts of speech is possible. In a most preferred embodiment, the most commonly used and most recently used words are stored in fast access memory such a solid state Random Access Memory (RAM). In embodiments where dictionaries are to be hand crafted, a fast method utilizing hashing, collision detection and buckets is preferred. In embodiments where the word sets are fixed before reading, perfect hashing without buckets is preferred.

In yet another embodiment, the level of pronunciation emphasis is derived as an attribute depending in part on the part of speech. In a most preferred embodiment, pronunciation emphasis is categorized as primary, secondary, and none. In one embodiment, the pronunciation time and actual sound, e.g. as found in a sound file, are also retrieved from the dictionary or glossary and stored as attributes of the word.

In step 128, reader and text specific word sets are searched. In a preferred embodiment, the reader specified word sets are stored in a separate database from the dictionary or glossary word sets, to allow for separate storage and faster retrieval. In one embodiment, reader specified word sets are checked before dictionaries, and the dictionaries only checked if needed words and attributes are not found in the reader specified word sets. Preferred embodiments utilize a hierarchy of databases to look up words.

In step 130, multiple parts of speech are disambiguated. In one embodiment, a microgrammar is used to determine the likely parts of speech. A microgrammar utilizes adjacent or nearby words to more accurately determine the most likely part of speech for a word. For example, the word "farm" in the phrase "a farm in " would likely be a noun as it is preceded by an article and succeeded by a preposition. As another example, if a word could be either a noun or verb, and the word is preceded by "could", "will", "shall", or "to", then the word is likely a verb. If the word "farm" were preceded by "will", the word is likely a verb. In another embodiment, all disambiguation is done simply by choosing the statistically most likely use of the word. In yet another embodiment, there is no automatic disambiguation, only manual disambiguation using human editing. In a preferred embodiment, an attribute of ambiguity is stored for each word, indicating whether multiple possible parts of speech still exist after disambiguation. In yet another embodiment, an ambiguity attribute is not stored but derived from the existence of multiple possible parts of speech stored for a word. In one embodiment, ambiguity is inferred from the visual display of striped or alternating text colors associated with each part of speech. For example, if verbs are orange and adjectives are yellow, then a possible verb or adjective could have alternating yellow and orange stripes or text characters.

In one embodiment of the invention, parts of speech are determined in part by searching for morphemes (root words) and assigning part of speech attributes based on endings e.g. -ly, -ing.

In step 132, the attributes determined for the words and phrases are stored, creating an "enriched sentence", which will likely remain unchanged between readers. For example, the educational level and part of speech of a word will remain unchanged for different readers, even though they may desire different text segment lengths and presentations rates. In one embodiment, the enriched sentence is stored in persistent storage such as a file. In another embodiment, the enriched text is stored on CD-ROM. In a preferred embodiment, the enriched sentence is implemented as a linked list of nodes, each node having the word and phrase attributes described above including the position of the word in the original text.

Figure 5:
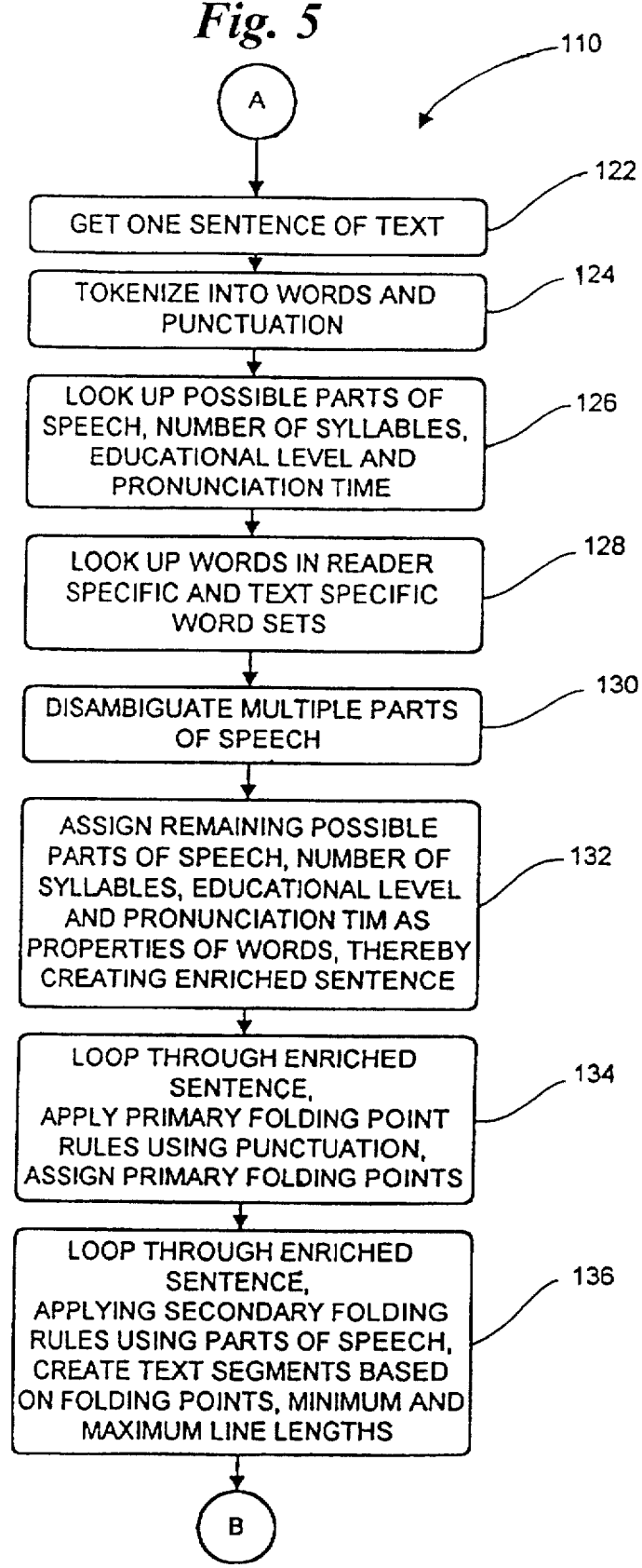
FIG. 5 illustrates step 110 in detail.
Figure 7:
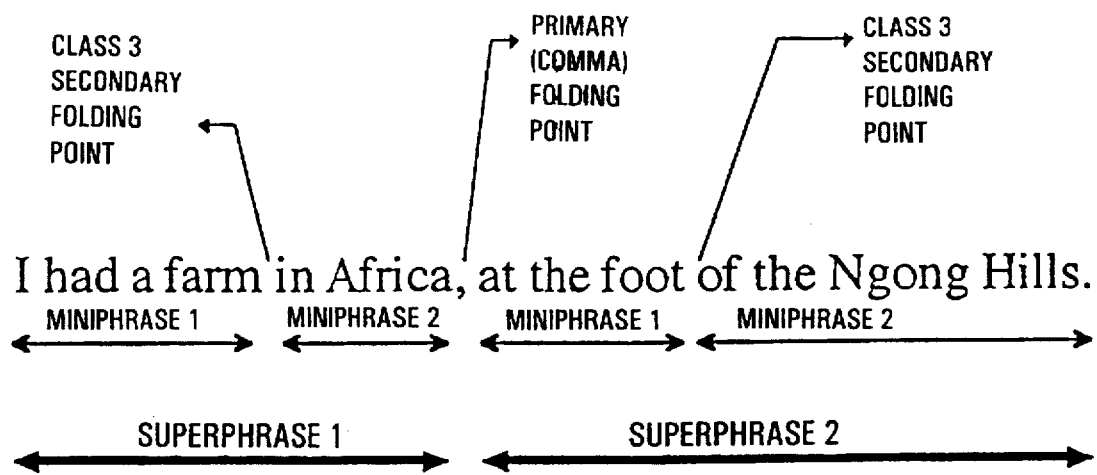
FIG. 7 illustrates folding point locations in a sentence.

In FIG. 5, step 134, primary folding points are determined by applying primary folding point rules. Folding points are text dividing points located between letters. In a preferred embodiment, folding points are classified as primary and secondary. Primary folding points are determined using primary folding rules which determine primary folding point locations based on punctuation marks. FIG. 7 illustrates a primary folding point after the comma following "Africa". Primary folding points divide text into "Super-phrases". In a preferred embodiment, primary folding points are located at every comma, colon, semi-colon, and left parenthesis, brace, and curly bracket. The folding point location can be stored as an attribute in a node in a linked list of nodes forming the enriched sentence.

Secondary folding points are determined applying secondary folding point rules. In preferred embodiments, secondary folding points and rules are ranked in a hierarchy and secondary folding rules accept parts of speech as inputs. In a most preferred embodiment, secondary folding rules include as rule inputs attributes of the text content of the text segments and phrases being processed. For example, a secondary folding point may be called for by a segment of text exceeding a reader preferred maximum text segment weight even though a maximum text segment length has not been reached.

Continuous attributes such as phrase difficulty, density, complexity, power and pronunciation time may be used as inputs to a rule modifying the ranking established by a table such as that of FIG. 6, using parts of speech alone to determine secondary folding part rankings. For example, a segment of text having a weight greater than 35 percent above the text average would have a Class rank of 1 assigned regardless of the rank otherwise called for by the table of FIG. 6. In one preferred embodiment, phrase weight or power is used exclusively to determine secondary folding point rankings, rather than solely parts of speech.

In an alternate embodiment, folding rules call for folding based on the number of characters on the line, and the parts of speech are displayed using colors corresponding to a word's part of speech. The later embodiment may not offer the advantages of cascading, but does offer visual display cues based on text content.

FIG. 6 illustrates a table used in a preferred embodiment to determine secondary folding points. For example, prepositions determine Class 3, Subclass 1, secondary folding points. In FIG. 7, there are class 3 secondary folding points before the prepositions "in" and "of". Secondary folding points divide Super-phrases into "Mini-phrases", as illustrated in FIG. 7. Mini-phrases are related to text segments in that Mini-phrases are often the same as text segments and are often displayed each on a new line. Once Mini-phrases are identified however, rules may dictate that more or less than one Mini-phrase appear as a text segment on a line.

Primary folding rules are applied first, followed by secondary folding rules, applied in order of the folding rule rank. An example of secondary folding rule ranking is shown in FIG. 6, established by the ranking of the word sets giving rise to the secondary folding points. Some preferred embodiments use either phrase weight or power to determine secondary folding point rank rather than solely using parts of speech. A most preferred embodiment allows reader entry of a preference for parts of speech or phrase weight/ power determination of secondary folding point ranking. Some readers prefer text segmentation based on structure, while others prefer text segmentation based on complexity or estimated time to read a text segment.

In a preferred embodiment, secondary folding rules are applied only until a limit is reached. This limit is often the minimum line length. One method of determining the location of secondary folding points is shown in FIG. 5, step 136, and in detail in FIG. 8, step 136. In one embodiment, where the application of a secondary folding rule to a Super-phrase would result in a Mini-phrase length less than the minimum specified line length, the folding rule is not applied and no further folding rules are applied to that Super-phrase. Conversely, when no folding point would otherwise exist in a line exceeding the maximum line length, a collapse rule is applied, forcing the folding of the text into two lines. When all Super-phrases are to have no further folding rules applied, the folding process is complete.

In FIG. 1, step 111, the parameters, attributes, and folding rules can be used as input to the horizontal displacement rules. The horizontal displacement rules determine the horizontal location of the text segment. In a preferred embodiment, horizontal displacement rules include both horizontal justification rules and descent angle rules. Horizontal displacement in this embodiment is the sum of the results from the horizontal justification rule and the descent angle rule. In an easy to implement embodiment, the horizontal displacement rule is simply the descent angle as applied to the center justified text segment. Such an embodiment does not utilize the folding rule terminating the preceding text segment as input and provides minimum eye movement while reading the sentence cascade. Another embodiment adds left descent for preceding Class 1 folding points, and right descent for preceding Class 3 folding points. A preferred embodiment allows reader specified additional right or left displacement for folding points, including reader entered values for primary folding points, and each class and subclass of secondary folding points. One embodiment stores the added displacement in a table in units of characters. With the horizontal displacement determined, presenting the text remains.

Figure 9:
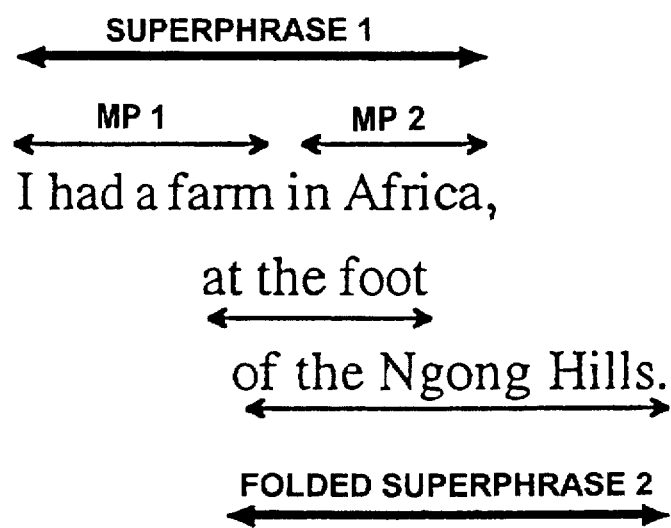
FIG. 9 illustrates the sentence of FIG. 7 presented as enhanced text.

In the example of FIG. 9, Super-phrase 1, "I had a farm in Africa" is divided from Super-phrase 2, "at the foot of the Ngong Hills.", by the primary folding point after the comma. Super-phrase 2 is divided into two Mini-phrases by the secondary folding point before the preposition "of". In the embodiment illustrated in FIG. 9, two miniphrases are presented as the same text segment as the mini-phrase "in Africa", is below the three word minimum length specified by the reader. The first Mini-phrase, "at the foot", in a new line is center justified below the text segment above and right shifted by a right descent angle. The last Mini-phrase of "of the Ngong Hills", is left shifted because of a horizontal displacement rule calling for left shifting when the preceding line terminated with a secondary rather than primary folding point. Thus, in the FIG. 9 example, the total horizontal displacement is determined by a combination of the decent angle and the justification of the line.

Paired punctuation marks including parentheses, braces, brackets, and quotation marks, serve as punctuation marks which determine primary folding point locations in a preferred embodiment. In one embodiment, such paired punctuation is included as an input to the horizontal displacement rules, including horizontal justification and descent angle rules. For example, a long multi-phrase text segment contained within parentheses might have reduced horizontal shifts and reduced vertical displacement, i.e., less line to line spacing than the other text in the active display area of the display surface.

In step 112, the enhanced text is created. In this step, the codes needed to create a properly displayed text segment are created. For example, where the reader specifications require coloring technical words red, and the enriched text indicates a word is a technical word, an escape sequence may be created that will be interpreted by the display step as requiring red text. Similar coding may be required for animation. The enhanced text may be stored at this point for later display.

In step 113, the enhanced text is presented on the display device, one text segment per newly formed line. The enhanced text can also include the animation, background color, text color, tagging, and presentation rates discussed above. In a preferred embodiment, the background color is presented as a function of the sentence and paragraph positions.

Figure 11:
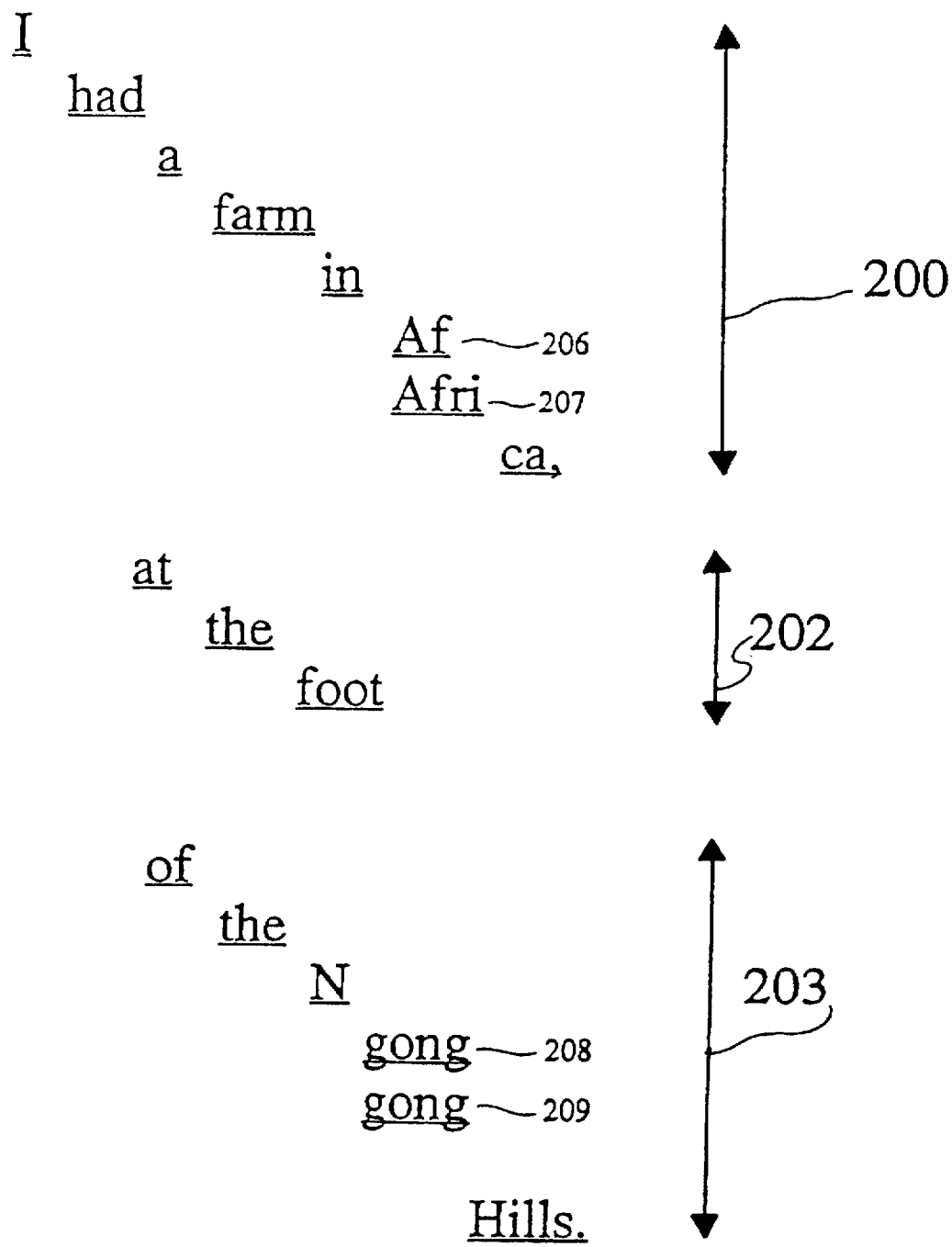
FIG. 11 illustrates the sentence of FIG. 7 showing visual pronunciation of emphasized syllables.

In another embodiment, illustrated in FIG. 11, some text is initially presented in one color or brightness for a time period, followed by presentation in a second color or brightness. In FIG. 11, the sentence is presented on three newly formed lines indicated by arrows 200, 202, and 203. Within those lines, the text is presented all on the same line, with the words of FIG. 11 shown on different lines to illustrate the temporal change of initial text color/highlight 206 to text color/highlight 207, and initial text color/highlight 208 to 209. The "Af" text at 206 is the emphasized syllable in "Africa", and is initially shown in color/highlight 206 for this reason. The "gong" text is also the emphasized syllable in "Ngong", and has initial color/highlight 208, followed by color/highlight 209.

The preferred embodiment depicted in FIG. 1 allows the enriched text from step 132 and enhanced text from step 113 to be edited. In a preferred embodiment, a word pointing device such as a mouse is used to select a portion of text to be edited. The enriched sentence corresponding to that portion of enhanced text is internally selected, and the attributes made available for editing. This may be implemented using pull-down menus allowing each attribute of the enriched text and enhanced text to be edited. Where edits to the enriched text could effect presentation, the text is preprocessed according to step 110 again. In the edit session of step 114, reader annotations, either hidden or immediately visible, are accepted and can be stored in the enriched and enhanced sentences. Such annotations perform the same function as hand written notes in a book. The features editable include parts of speech, definition, color, text, folding points, and horizontal displacement.

The edited attributes and display of this embodiment may also be stored, in step 116, preserving the changes. In one embodiment, only the enhanced sentences are stored. In a preferred embodiment, both the enriched and enhanced text are stored. In preferred embodiments, some edits are recorded either as reader specific or global, for presentation to all readers of the text. Manual editing of the enhanced text is especially useful where the same text will be viewed repeatedly by others, as with an electronic book.

In a variation of the embodiment of FIG. 1, steps 113, 114, and 116 are omitted, with no human intervention and no immediate display. In this embodiment, enriched and enhanced text is created and stored for future display. The enhanced text can be stored in standard word processing format such as Microsoft Word (TRADEMARK) or Corel Word Perfect (TRADEMARK) binaries. In this embodiment, the presentation software can be simple, small, and fast relative to the software required to look up words and analyze text. Such a presentation is a preferred embodiment for the mass distribution of enhanced text for reading as "electronic books."

In a related variation of the embodiment of FIG. 1, enhanced text itself is retrieved in step 106, with no preprocessing required and no edits allowed. Such a presentation is also a preferred embodiment for the mass distribution of enhanced text for reading as "electronic books".

Referring to FIG. 1, step 113, the presentation of each screen of enhanced text may be manually triggered as by a mouse click. In a preferred embodiment, the rate of presentation is controlled by reader specified parameters including display time for the text, and inter-sentence and inter-paragraph arrival times. In a most preferred embodiment, the Text Content is measured, and the text presentation interval is dependent on this Text Content. In a preferred embodiment, the pronunciation time of the text is used as a measure of Text Content to determine presentation interval. In another embodiment, the phrase weights are used to measure Text Content and to determine presentation interval.

Figure 10:
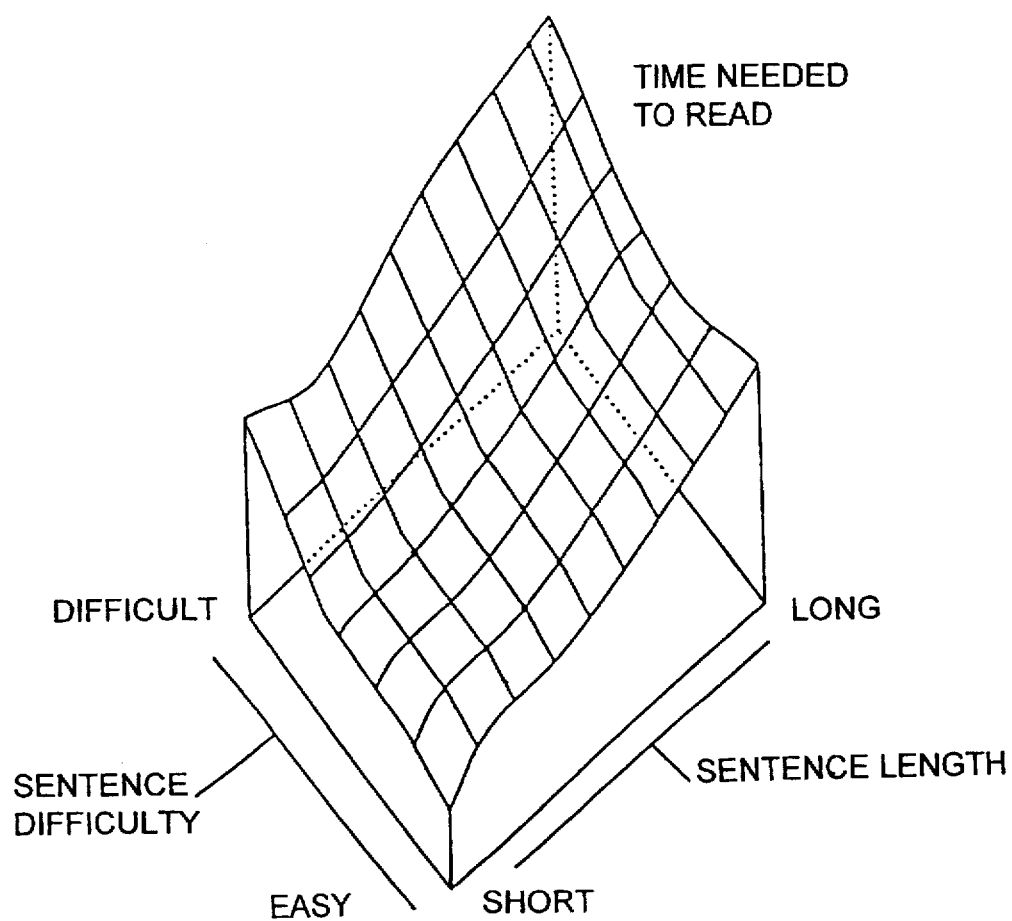
FIG. 10 illustrates a Presentation Interval Sampling History Map, wherein the time needed to read is a function of sentence difficulty and complexity.

A preferred embodiment allows readers to extend the presentation time for a sentence, as well as speed up and slow down the presentation rate. This rate can be recorded, as can the sentence length and sentence difficulty corresponding to a particular presentation interval. FIG. 10 illustrates an example 3-D plot, a "Presentation Interval Sampling History Map", depicting the time needed to read a sentence as a function of two attributes, sentence difficulty and sentence length. The time needed to read can be measured by reader preferences or by previously mentioned eye movement tracking or brain wave activity. The time can then be correlated against two attributes as in FIG. 10, or any number of attributes. The presentation interval in a preferred embodiment is continuously adjusted to match the predicted required reading time.

In yet another embodiment, most appropriate where reading rate is closely measured, the inputs to folding rules are varied and the resulting reading rate tracked. In an embodiment suitable for creating an optimal mass market reading product, inputs to folding rules are varied and reading rates recorded for a sample population. The inputs are varied for optimal reading speed and comprehension. For example, the importance accorded by secondary folding rules to parts of speech relative to phrase weight is varied for optimal reading speed.

In another embodiment, reader manual editing of initial sentence display is analyzed for relative contribution of sentence structure, parts of speech, length, and complexity. After such an initial "tuning" or "training" period, similar weightings are used in folding rules for automatic text enhancement. Subsequent edits may be used to further refine the folding rules.

In step 118, text presentation stops when there is no more text or a reader request to stop. Steps 120 provides for clean-up including final enriched and enhanced text storage, as well as historical storage about the reading session.

Numerous characteristics and advantages of the invention covered by this document have been set forth in the forgoing description. It will be understood, however, that this disclosure is, in many respects, only illustrative. Changes may be made in details, particularly in matters of combining, separating, and arranging steps, without exceeding the scope of this invention. The invention's scope is, of course, defined in the language in which the appended claims are expressed.

What is claimed is:

1. A method for enhancing text presentation comprising:
   a) extracting text specific attributes from said text; and
   b) varying said text presentation in accordance with said attributes, wherein said text specific attributes include a text difficulty measure, and said text presentation includes an automatic text advancement rate, and said presentation includes varying said text presentation rate in accordance within said text difficulty measure.

2. A method for enhancing text presentation as recited in claim 1, wherein said text difficulty measure includes an estimated pronunciation time of said text.

3. A method for enhancing text presentation as recited in claim 1, wherein said text difficulty measure includes an estimated educational level of said text.

4. A method for enhancing text presentation as recited in claim 1, wherein said text difficulty measure includes the number of syllables in said text.

5. A method for enhancing text presentation comprising:
   a) extracting text specific attributes from said text; and
   b) varying said text presentation in accordance with said attributes, wherein
   i) said attributes include punctuation and parts of speech,
   ii) extracting includes parsing said text into punctuation and parts of speech,
   iii) said varied text presentation is implemented using rules having inputs and outputs, said rule inputs including said parts of speech, said rule outputs including said visual attributes,
   iv) said enhanced text presentation includes visual attributes and said rule outputs include said visual attributes,
   v) said rules include folding rules, said folding rules divide said text into text segments, said folding rule inputs include punctuation, said folding rule inputs include parts of speech,
   vi) said visual attributes include the displaying of said text segments on new lines,
   vii said rules include horizontal displacement rules,
   viii said visual attributes include text segment horizontal displacement, and
   viv said horizontal displacement rules include parts of speech as inputs and horizontal displacement as outputs.

6. A method for enhancing text presentation as recited in claim 5 further comprising:
   a) accepting user edits of the displayed text folding points; and
   b) storing the user edits in machine readable form.

7. A method for enhancing text presentation as recited in claim 6 further comprising:
   a) accepting user edits of the displayed text parts of speech; and
   b) storing the user edits in machine readable form.

8. A method for enhancing text presentation as recited in claim 6 further comprising:
   a) accepting user annotations to the displayed text parts of speech; and
   b) storing the user annotations in machine readable form.

9. A method for enhancing text presentation as recited in claim 5 wherein said folding rules include primary rules and secondary rules, wherein said primary rules include punctuation as inputs, wherein said secondary rules parts of speech as inputs.

10. A method for enhancing text presentation as recited in claim 9 wherein said folding rules further include a micro-grammar for disambiguating said parts of speech.

11. A method for enhancing text presentation comprising:
   a) providing a plurality of folding rules which utilize punctuation;
   b) providing text segment horizontal displacement rules;
   c) parsing said text into words and punctuation;
   d) determining folding point locations in said text by applying said folding rules, utilizing said punctuation, thereby dividing said text into text segments;
   e) applying said text segment horizontal displacement rules to said text segments, thereby determining a horizontal displacement for each text segment; and
   f) displaying said text segments each on a new line, each displayed text segment having said determined horizontal displacement.

12. A method for enhancing text as recited in claim 11 wherein said folding rules utilize parts of speech as inputs, further comprising, determining the likely parts of speech of said words from said parsing step.

13. A method for enhancing text as recited in claim 12 wherein said text is a sentence.

14. A method for enhancing text as recited in claim 12 further comprising:
   a) providing color display rules, wherein said color display rules include parts of speech as inputs and text color as an output; and
   b) displaying said text according to said text color output.

15. A method for enhancing text presentation comprising:
   a) providing folding rules utilizing parts of speech and punctuation marks, wherein said folding rules include primary rules and secondary rules, said primary rules utilizing punctuation marks and said secondary rules utilizing parts of speech, wherein said secondary folding rules include a micro-grammar for disambiguating the parts of speech;
   b) providing text segment horizontal displacement rules, wherein the rules utilize parts of speech;
   c) providing a minimum text segment length;
   d) providing a maximum text segment length;
   e) parsing said text into words and punctuation marks;
   f) determining the likely parts of speech of the words from step e;
   g) determining primary folding point locations in said text by applying the primary folding rules, thereby dividing said text into super-phrases;
   h) determining secondary folding point locations in the super-phrases by applying the secondary folding rules, thereby dividing the super-phrases into text segments;
   i) repeating step h until all text segments are no greater than the maximum text segment length, and no less than the minimum text length;
   j) applying the text segment horizontal displacement rules to the text segments, thereby determining the horizontal displacement for each text segment; and
   k) displaying each text segment on a new line, each text segment having the determined horizontal displacement.

16. A method for enhancing text presentation as recited in claim 15 further comprising:
   a) accepting user edits of the displayed text folding points; and
   b) storing the user edits in machine readable form.

17. A method for enhancing text presentation as recited in claim 15 further comprising:
   a) accepting user edits of the displayed text parts of speech; and
   b) storing the user edits in machine readable form.

18. A method for enhancing text presentation as recited in claim 15 further comprising:
   a) accepting user annotations to the displayed text parts of speech; and
   b) storing the user annotations in machine readable form.

19. A device for enhancing text presentation comprising:
   a) a parsing means for parsing said text into words and punctuation marks;
   b) a means for determining likely parts of speech for the words resulting from step a;
   c) a means for determining folding point locations in the text including applying folding rules, which utilize said parts of speech and said punctuation marks, thereby dividing said text into text segments;
   d) a means for determining text segment horizontal displacement applying text segment horizontal displacement rules to the text segments, thereby determining the horizontal displacement for each text segment; and
   e) a means for displaying the text segments each on a new line, each having the determined horizontal displacement.

20. A device for enhancing text presentation as recited in claim 19 further comprising:
   a) a means for selecting a color based on said parts of speech; and
   b) a means for displaying said text according to said selected color.

21. A device for enhancing text presentation comprising:
   a) a parser capable of parsing text into words and punctuation marks;
   b) a table containing words and likely parts of speech corresponding to the words;
   c) a folding point location determinator which applies folding rules which utilize parts of speech and punctuation marks, thereby dividing the text into text segments;
   d) a text segment horizontal displacement determinator which applies text segment horizontal displacement rules and determines the horizontal displacement for each text segment; and
   e) a text segment display for displaying the text segments each on a new line, utilizing the determined horizontal displacement.

* * * * *